L. E. FISH.
Apparatus for Carbureting and Purifying Gas and Air.
No. 164,825. Patented June 22, 1875.

UNITED STATES PATENT OFFICE.

LEANDER E. FISH, OF WASHINGTON, DISTRICT OF COLUMBIA.

IMPROVEMENT IN APPARATUS FOR CARBURETING AND PURIFYING GAS AND AIR.

Specification forming part of Letters Patent No. 164,825, dated June 22, 1875; application filed June 12, 1875.

*To all whom it may concern:*

Be it known that I, LEANDER E. FISH, of Washington city, District of Columbia, have invented a new and Improved Apparatus for Carbureting and Purifying Gas and Air; and I do hereby declare that the following is a full, clear, and exact description of the same, reference being had to the accompanying drawing forming a part of this specification, in which—

Figure 1:
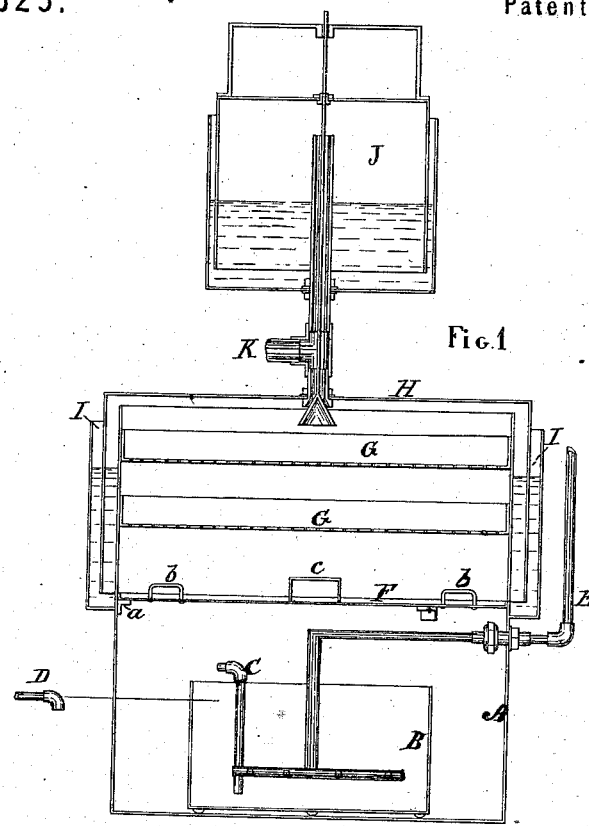
Figure 2:
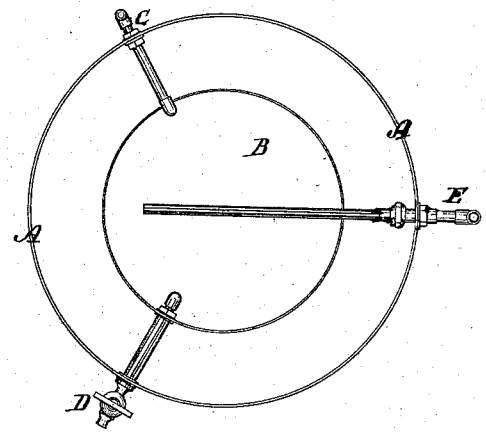

Figure 1 is a vertical section. Fig. 2 is a plan view.

This invention relates to certain improvements in apparatus for carbureting and purifying air and gases. It consists of a vessel having in the bottom thereof a detachable tank or chest for containing the oils or hydrocarbons for carbureting. Communicating with said oil-tank is a pipe for introducing the oil, a gage-pipe for regulating the amount of oil in the tank, and a perforated inlet-pipe, through which the air or gases is forced into the oil. Just above the oil tank or chest is a detachable cover with distributing-openings for the carbureted gas in its upward passage, and above said cover are located purifying-pans with bottoms of wire-gauze or perforated sheet metal. The top of the outer vessel is provided with an annular trough of water, in which the detachable cover is located, with a water-sealed connection, the said cover being provided with a pressure-regulator and an outlet for the gas.

In the drawing, A represents the outer case of the carbureter, in the bottom of which is contained a detachable oil tank or chest, B. This chest is made detachable, so that whenever its contents become heavily laden with impurities it may be readily removed and cleaned. C is a pipe passing through the side of the case A and chest B, and terminating in the bottom of the latter, through which said pipe the oils or hydrocarbons are introduced. D is a gage-pipe opening into the bottom of the oil-chest, through which the amount of oil in said chest may be ascertained. E is an inlet-pipe for the air or gas to be carbureted. Said pipe terminates in a perforated section in the bottom of the oil-chest, and through the perforations the air or gas is forced into the oil to be carbureted. All of these said pipes are made so as to allow the oil-chest to be easily removed, and as the outer case contains gas, and must be made gas-tight, the connection of the pipes with the same is made perfectly tight by means of elastic washers. Upon the inside of the case A are attached projections *a*, upon which, and just above the oil-chest, is supported a detachable cover, F. Said cover is provided with handles *b* for its removal, and has a central opening covered by a perforated shield or screen, *c*. The said opening and perforations allow the upward passage and distribution of the gas, and the shield prevents the purifying reagents from dropping down into the oil-chest below. G G' are a series of pans, resting one above the other, having wire-gauze or perforated sheet-metal bottoms, and containing some fibrous material, with lime and other purifying reagents for the gas. H is the cover of the outer case, which rests in an annular trough, I, and makes a water-sealed top. J is a pressure-regulator attached to the top of the carbureter, and having an outlet, K, for the gas. Said regulator consists of a small gas-holder contained within a tank of water, and attached to a valve which opens and closes the entrance to the same, according to the pressure.

Having thus described my invention, what I claim as new is—

1. The combination, with the case A, of the detachable oil-chest B, the inlet oil-pipe C, the gage-pipe D, and the inlet air and gas pipe E, terminating in the bottom of the oil-chest in a perforated section, substantially as and for the purpose described.

2. The combination of the case A, the detachable oil-chest B, the pipes C D E, the detachable cover F, and the purifying-pans G G', as and for the purpose specified.

3. The combination of case A, oil-chest B, pipes C D E, cover F, pans G G', detachable water-sealed cover H, and the pressure-regulator J, as and for the purpose set forth.

LEANDER E. FISH.

Witnesses:
EDWD. W. BYRN,
SOLON C. KEMON.